US011626796B2

(12) United States Patent
Zafarana (10) Patent No.: US 11,626,796 B2
(45) Date of Patent: Apr. 11, 2023

(54) MULTIPHASE POWER CONVERTER WITH CLC RESONANT CIRCUIT

(71) Applicant: SEMICONDUCTOR COMPONENTS INDUSTRIES, LLC, Phoenix, AZ (US)

(72) Inventor: Alessandro Zafarana, Milan (IT)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/455,341

(22) Filed: Nov. 17, 2021

(65) Prior Publication Data

US 2022/0302828 A1  Sep. 22, 2022

Related U.S. Application Data

(60) Provisional application No. 63/200,622, filed on Mar. 18, 2021.

(51) Int. Cl.
 *H02M 3/07* (2006.01)
(52) U.S. Cl.
 CPC .................... *H02M 3/07* (2013.01)
(58) Field of Classification Search
 CPC ........ H02M 3/07; H02M 3/01; H02M 3/1586; H02M 1/36; H02M 1/0095
 See application file for complete search history.

(56) References Cited

U.S. PATENT DOCUMENTS

| 10,122,256 | B1 | 11/2018 | Babazadeh et al. |
| 10,547,241 | B1* | 1/2020 | Li .................... H02M 3/1588 |
| 2016/0352218 | A1* | 12/2016 | Stauth ............... H02M 3/07 |
| 2017/0085189 | A1* | 3/2017 | Madsen ............. H02M 1/44 |
| 2020/0067409 | A1* | 2/2020 | Li .................... H02M 1/08 |
| 2022/0115953 | A1* | 4/2022 | Rainer .............. H02M 1/007 |
| 2022/0263410 | A1* | 8/2022 | Saggini ............. H02M 1/0083 |

OTHER PUBLICATIONS

Chen, Minjie et al.; "A Series-Capacitor Tapped Buck (SC-TaB) Converter for Regulated High Voltage Conversion Ratio Dc-Dc Applications"; IEEE Publication No. 978-1-4799-7/14/$31.00, Published Jul. 2014; Downloaded from IEEE Xplore Aug. 28, 2020; 8 pages; Copyright 2014 IEEE.

(Continued)

*Primary Examiner* — Sibin Chen
(74) *Attorney, Agent, or Firm* — Dickinson Wright PLLC; Mark E. Scott (57) ABSTRACT

Multiphase power converter with CLC resonant circuit. One example is a method of operation a power converter, the method including: charging, during a first on-time, a first output inductor by way of a first switching-tank circuit defining a first switch node coupled to a first lead of a resonant inductor; creating, during the first on-time, a first current flow into the first switching-tank circuit through the resonant inductor; and then charging, during a second on-time, a second output inductor by way of a second switching-tank circuit defining a second switch node coupled to a second lead of the resonant inductor; and creating, during the second on-time, a second current flow into the second switching-tank circuit through the resonant inductor.

16 Claims, 6 Drawing Sheets

(56) References Cited

OTHER PUBLICATIONS

Kirshenboim, Or et al.; "High-Efficiency Nonisolated Converter With Very High Step-Down Conversion Ratio"; IEEE Transactions on Power Electronics, vol. 32, No. 5, May 2017; Published Jul. 18, 2016; Downloaded Oct. 8, 2020 from IEEE Xplore; 8 pages; Copyright 2016 IEEE.

Pan, Chin-Tsai et al.; "A Novel Transformerless Interleaved High Step-Down Conversion Ratio DC-DC Converter With Low Switch Voltage Stress"; IEEE Transactions on Industrial Electronics, vol. 61, No. 10, Oct. 2014; Published Jan. 21, 2014; Downloaded Oct. 8, 2020 from IEEE Xplore; 10 pages; Copyright 2014 IEEE.

Zheng, Yifei et al.; "Nonisolated High Step-Down Converter ZVS and Low Current Ripples"; IEEE Transactions on Industrial Electronics, vol. 66, No. 2, Feb. 2019; Published May 3, 2018; Downloaded Oct. 8, 2020 from IEEE Xplore; 12 pages; Copyright 2018 IEEE.

\* cited by examiner

MULTIPHASE POWER CONVERTER WITH CLC RESONANT CIRCUIT

CROSS-REFERENCE TO RELATED APPLICATIONS

This application claims the benefit of provisional application No. 63/200,622 filed Mar. 18, 2021 titled "Multiphase Power Converter with CLC Resonant Circuit." The provisional application is incorporated by reference herein as if reproduced in full below.

BACKGROUND

Data centers, particularly data centers having mixed telecommunication equipment and servers, are transitioning toward distributing power within the racks in the 40V to 60V range (e.g., 48V), while most servers are specified to receive as a supply voltage a tightly regulated 12V. As the transition continues, there is a need for power converters to convert the distributed power at 40V to 60V to the tightly the regulated 12V with high efficiency (e.g., 98% or greater) and be easily scalable.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"About" in reference to a recited parameter shall mean the recited parameter plus or minus ten percent (+/−10%) of the recited parameter.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"FET" shall mean field effect transistor (e.g., a metal-oxide semiconductor FET (MOSFET)).

"Controller" shall mean, alone or in combination, individual circuit components, an application specific integrated circuit (ASIC), a microcontroller with controlling software, a reduced-instruction-set computing (RISC), a digital signal processor (DSP), a processor with controlling software, a programmable logic device (PLD), or a field programmable gate array (FPGA), configured to read inputs and drive outputs responsive to the inputs.

Many of the electrical connections in the drawings are shown as direct couplings having no intervening devices, but not expressly stated as such in the description below. Nevertheless, this paragraph shall serve as support in the claims for referencing any electrical connection as "directly coupled" for electrical connections shown in the drawing with no intervening device(s).

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to multiphase power converters having capacitor-inductor-capacitor (CLC) resonant circuits. In particular, example power converters may use a CLC resonant circuit to assist in achieving soft switching of electrically-controlled switches in each phase. More particularly still, example power converters utilize multiple switching-tank circuits having a resonant inductor coupled between respective switch nodes. In combination with pump capacitors in each switching tank circuit, the resonant inductor resonates and creates resonant currents. The resonant currents may be used to reduce current flow through at least one electrically-controlled switch of a first switching tank circuit during a first phase, and the resonant current may be used to reduce current flow through at least one electrically-controlled switch of a second switching tank circuit during a second phase. The specification first turns to an example system to orient the reader.

Figure 1:
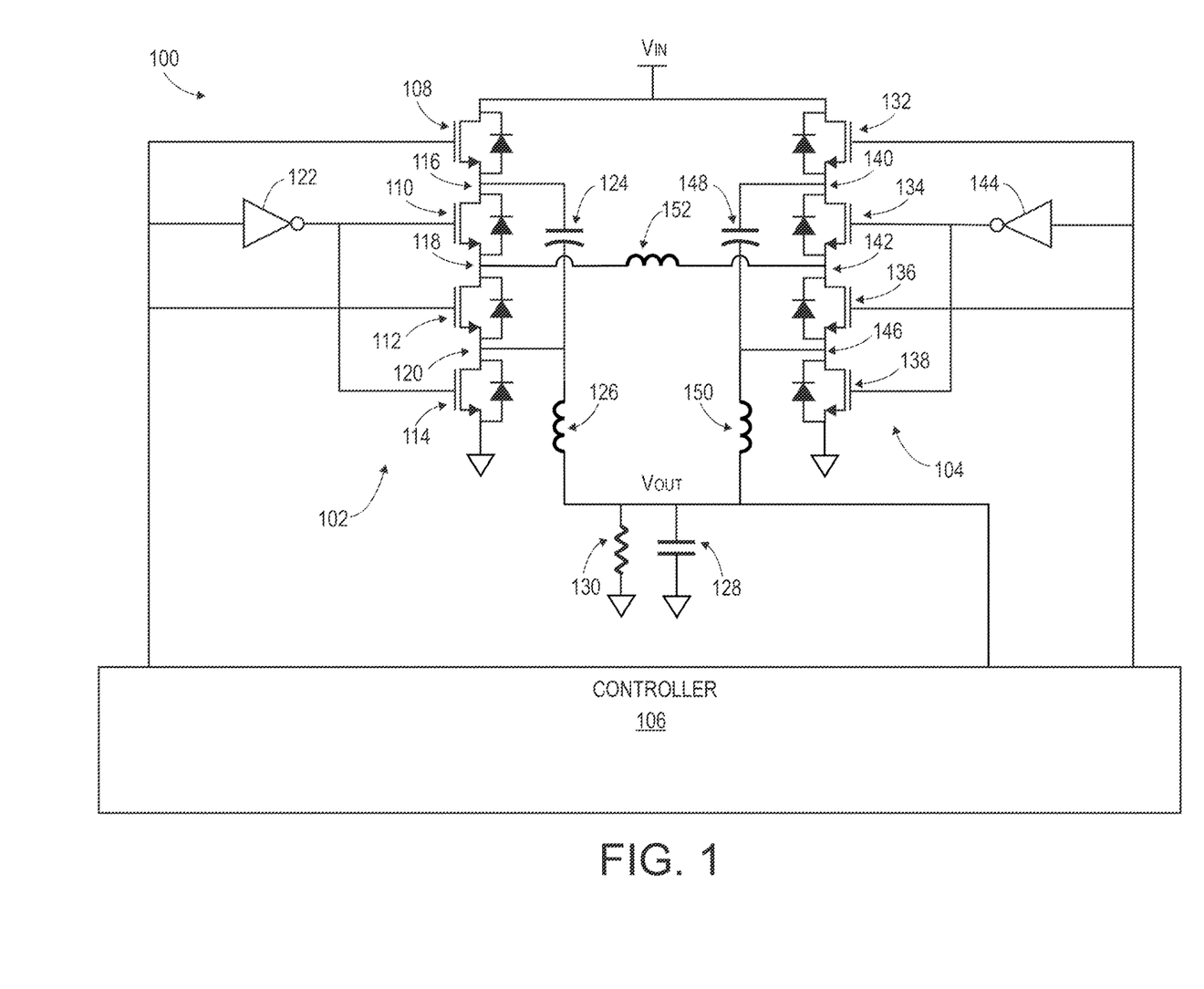
FIG. 1 shows a power converter in accordance with at least some embodiments.

FIG. 1 shows an example power converter 100. In particular, the example power converter 100 comprises a voltage input $V_{IN}$ and a voltage output $V_{OUT}$. In example cases, the voltage input $V_{IN}$ is in the range of about 40V to about 60V, and nominally about 48V. For the given voltage input $V_{IN}$, in many cases the voltage output $V_{OUT}$ may be about 12V, but the voltage output $V_{OUT}$ may selected at the discretion of the circuit designer (discussed more below). The example power converter 100 further comprises a switching-tank circuit 102, a switching-tank circuit 104, and a controller 106. Hereafter, the switching-tank circuit 102 will be referred to as the left switching-tank circuit 102, and the right switching-tank circuit 104 will be referred to as the right switching-tank circuit 104, but the designations left and right are arbitrary and shall not be read to require any particular physical layout.

The left switching-tank circuit 102 includes a series of electrically-controlled switches. In the example system, the electrically-controlled switches are illustratively shown as FETs. Hereafter, the electrically-controlled switches are referred to as FETs with the understanding that any suitable electrically controlled switch (e.g., junction transistors, FETs of any suitable variety) may be used. In particular, the left switching-tank circuit 102 comprises an upper FET 108, an upper-middle FET 110, a lower-middle FET 112, and a lower FET 114. The upper FET 108 has a first connection or drain coupled to the voltage input $V_{IN}$, a second connection or source defining a charge node 116, and a control input or gate coupled to the controller 106. The upper-middle FET 110 has a first connection or drain coupled to the charge node 116, a second connection or source defining a switch node 118, a control input or gate coupled to the controller 106 by way of a logic NOT gate 122. The lower-middle FET 112 has a first connection or drain coupled to the switch node 118, a second connection or source defining a phase node 120, and a control input coupled to the controller 106. The lower FET 114 has a first connection or drain coupled to the phase node 120, a second connection or source coupled to a reference voltage (e.g., ground or common), and a control input coupled to the controller 106 by way of the logic NOT gate 122. The left switching-tank circuit 102 further comprises a pump capacitor 124 having an upper lead coupled to the charge node 116 and a lower lead coupled to the phase node 120. The left switching-tank circuit 102 also comprises an output inductor 126 having an upper lead coupled to the phase node 120 and a lower lead defining the output voltage $V_{OUT}$. The output voltage $V_{OUT}$ is coupled to an output capacitor 128 and a load, the load illustratively shown as resistor 130.

The right switching-tank circuit 104 includes a series of electrically-controlled switches, again illustratively shown as FETs. With respect to the FETS in the right switching-tank circuit 104, this specification uses "top" and "bottom" terminology as a naming convention to reduce confusion with similarly situated FETs in the left switching-tank circuit 102. In particular, the right switching-tank circuit 104 comprises a top FET 132, a top-middle FET 134, a bottom-middle FET 136, and a bottom FET 138. The top FET 108 has a first connection or drain coupled to the voltage input $V_{IN}$, a second connection or source defining a charge node 140, and a control input or gate coupled to the controller 106. The top-middle FET 134 has a first connection or drain coupled to the charge node 140, a second connection or source defining a switch node 142, and a control input or gate coupled to the controller 106 by way of a logic NOT gate 144. The bottom-middle FET 136 has a first connection or drain coupled to the switch node 142, a second connection or source defining a phase node 146, and a control input coupled to the controller 106. The bottom FET 138 has a first connection or drain coupled to the phase node 146, a second connection or source coupled to the reference voltage, and a control input coupled to the controller 106 by way of the logic NOT gate 144. The right switching-tank circuit 104 further comprises a pump capacitor 148 having a top lead coupled to the charge node 140 and a bottom lead coupled to the phase node 146. The right switching-tank circuit 104 also comprises an output inductor 150 having a top lead coupled to the phase node 146 and a bottom lead also defining the output voltage $V_{OUT}$.

The example power converter 100 further comprises a resonant inductor 152 that couples the switch nodes of the switching-tank circuits. In particular, the resonant inductor 152 has a left lead coupled to the switch node 118 of the left switching-tank circuit 102, and a right lead coupled to the switch node 142 of the right switching-tank circuit 104. As will be discussed in greater detail below, and at certain times during operation of the power converter 100, the resonant inductor 152 creates a periodic current flows through the resonant inductor 152 between the pump capacitor 124 of the left switching-tank circuit 102 and the pump capacitor 148 of the right switching-tank circuit 104. Stated differently, a resonant current flows into the left switching-tank circuit 102 at certain times during operation (e.g., the on-time of the left switching-tank circuit 102), and the resonant current flows into the right switching-tank circuit 104 at certain times during operation (e.g., the on-time of the right switching-tank circuit 104). The resonant current flowing into the respective switching-tank circuits may be used to reduce current flow through at least some of the FETs (e.g., the upper FET 108, and the top FET 132) such that those FETs can be soft switched. That is, in some cases the FETs may be turned off with low or zero current flow through the FETs. Stated equivalently, the FETs may be turned off with low or zero voltage across the FETs.

The specification now turns a step-by-step explanation of operation of the power converter 100. In the following figures, when a FET is conductive the FET will be shown as a short circuit, and when a FET is non-conductive the FET will be shown as an open circuit (or just the FETs body diode). Moreover, in the following the controller 106 is omitted so as not to further complicate the figures; however, it will be understood that the controller 106 controls the overall process by asserting the gates of the example FETs at the appropriate times. The explanation assumes the power converter 100 to have been operational for a period of time such that startup operation considerations are not a concern. Startup issues will be addressed later in the specification.

In operation, each switching-tank circuit has an on-time within which the switching-tank circuit charges its respective output inductor. For example, during an on-time of the left switching-tank circuit 102 the left output inductor 126 is charged. The left output inductor 126 provides current to the voltage output $V_{OUT}$ during the on-time and at least a portion of the time between on-times. Similarly, during an on-time of the right switching-tank circuit 104 the right output inductor 150 is charged. Thus, the right output inductor 150 provides current to the voltage output $V_{OUT}$ during the on-time and at least a portion of the time between on-times. The on-times of the left switching-tank circuit 102 begin at a switching frequency, and similarly the on-times of the right switching-tank circuit 104 begin at the switching frequency.

However, the left switching-tank circuit 102 and right switching-tank circuit 104 operate at a different phase relationship. In particular, while operating the same switching frequency, in example cases the on-time of switching-tank circuits are separated by 180° degree phase relationship.

Figure 2A:
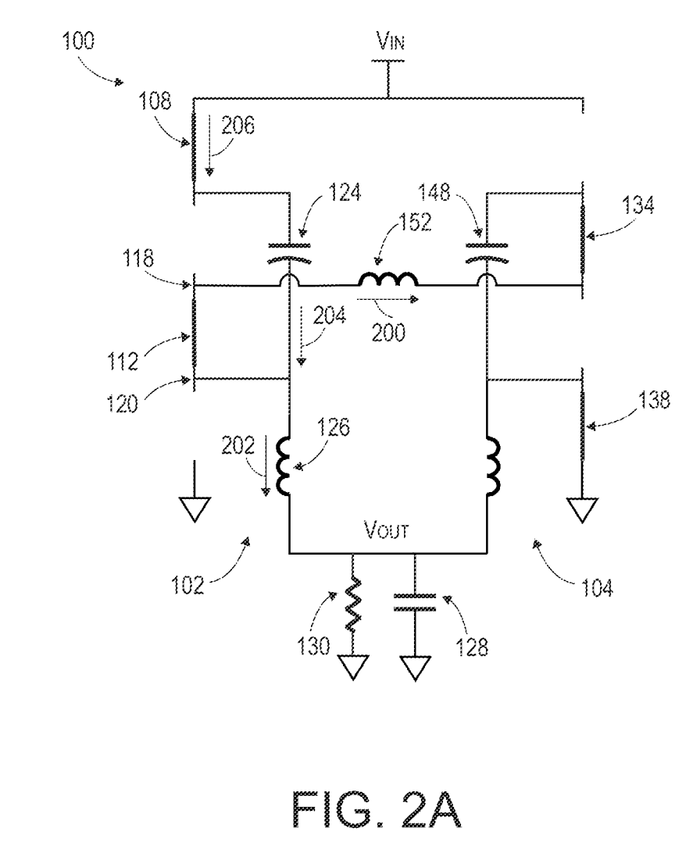
FIG. 2A shows an electrical schematic of power converter during the on-time of the example left switching-tank circuit, in accordance with at least some embodiments.

FIG. 2A shows an electrical schematic of the power converter 100 during the on-time of the left switching-tank circuit 102 (hereafter the referred to as the "left on-time"). In particular, just before the left on-time, the left pump capacitor 124 holds a non-zero voltage. In most cases, just before the left on-time the voltage on the left pump capacitor 124 has a voltage that is about half the voltage input (e.g., about $V_{IN}/2$). When the left on-time begins, the upper FET 108 and the lower-middle FET 112 are made conductive by simultaneous assertion of their respective gates. Making conductive the upper FET 108 and the lower-middle FET 112 pumps the voltage held on the left pump capacitor 124 to the phase node 120 and thus the left output inductor 126.

Because of the inductance of the resonant inductor 152 and the inductance of the output inductor 126, current flow in the left switching-tank circuit 102 is initially as shown in FIG. 2A. That is, initially the resonant current in the resonant inductor 152 flows out of the left switching-tank circuit 102 toward the right switching-tank circuit 104, as shown by arrow 200. Moreover, the output inductor 126 creates a current flow toward the voltage output $V_{OUT}$, as shown by arrow 202. It follows that the initial current flows are provided by the pump capacitor 124, as shown by arrow 204, and a corresponding current flow through the upper FET 108, as shown by arrow 206.

During the left on-time, certain of the electrically-controlled switches in the right switching-tank circuit are also conductive. In particular, during the left on-time the top-middle FET 134 and the bottom FET 138 are conductive. It follows that the resonant inductor 152 is coupled in series with both the left pump capacitor 124 and the right pump capacitor 148. More particularly, the upper lead of the pump capacitor 124 is coupled to the voltage input $V_{IN}$ (by way of the upper FET 108), the lower lead of the left pump capacitor 124 is coupled to the left lead of the resonant inductor 152 (by way of the lower-middle FET 112), the right lead of the resonant inductor 152 is coupled to the top lead of the pump capacitor 148 (by way of the top-middle FET 134), and the bottom lead of the pump capacitor 148 is coupled to the reference voltage (by way of the bottom FET 138). Thus, the left pump capacitor 124, the resonant inductor 152, and the right pump capacitor 148 form a CLC resonant circuit. As the left on-time continues, the resonance of the CLC resonant circuit reverses the current through the resonant inductor 152 from that shown in FIG. 2A such that the resonant current eventually flows into the left switching-tank circuit 102.

Figure 2B:
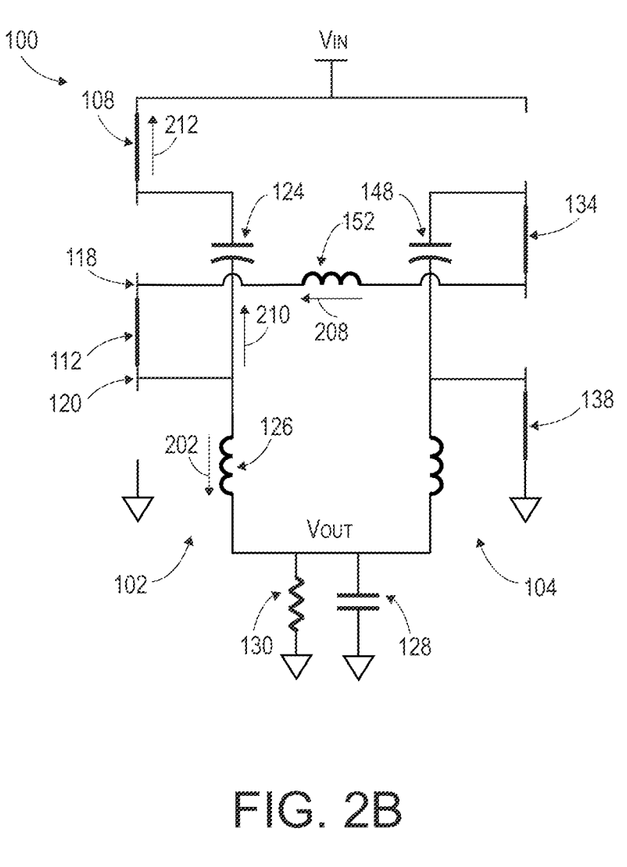
FIG. 2B shows an electrical schematic of power converter during the on-time of the example left switching-tank circuit, in accordance with at least some embodiments.

FIG. 2B shows an electrical schematic of the power converter 100 during a later portion of the example left on-time. In particular, because of the CLC resonant circuit, the direction of current flow through the resonant inductor 152 changes direction such that the current flow is into the left switching-tank circuit 102 (e.g., into the switch node 118). That is, the resonant current in the resonant inductor 152 flows out of the right switching-tank circuit 104 toward the left switching-tank circuit 102, as shown by arrow 208. The left output inductor 126 still creates the current flow toward the voltage output $V_{OUT}$, as shown by arrow 202. The current flow in relation to the left pump capacitor 124, however, changes direction such that current flows to the left pump capacitor 124, as shown by arrow 210. In accordance with example systems, the resonant current flow in the later portions of the left on-time charges the left pump capacitor 124 sufficiently to reduce current flow through the upper FET 108. In some example cases, the current flow from the voltage input $V_{IN}$ through the upper FET 108 to the pump capacitor 124 is reduced to zero, and in other cases the current flow through the upper FET 108 reverses direction, as shown by arrow 212. Regardless of the precise magnitude of the reduction of current flow through the upper FET 108 (including reversal), once the reduction in current flow occurs the left on-time ends by making the upper FET 108 and the lower-middle FET 112 non-conductive. However, because of the reduced current flow, the upper FET 108 being made non-conductive is a soft switching event that reduces power loss, as compared to interrupting signification current flow through the upper FET 108.

Figure 3:
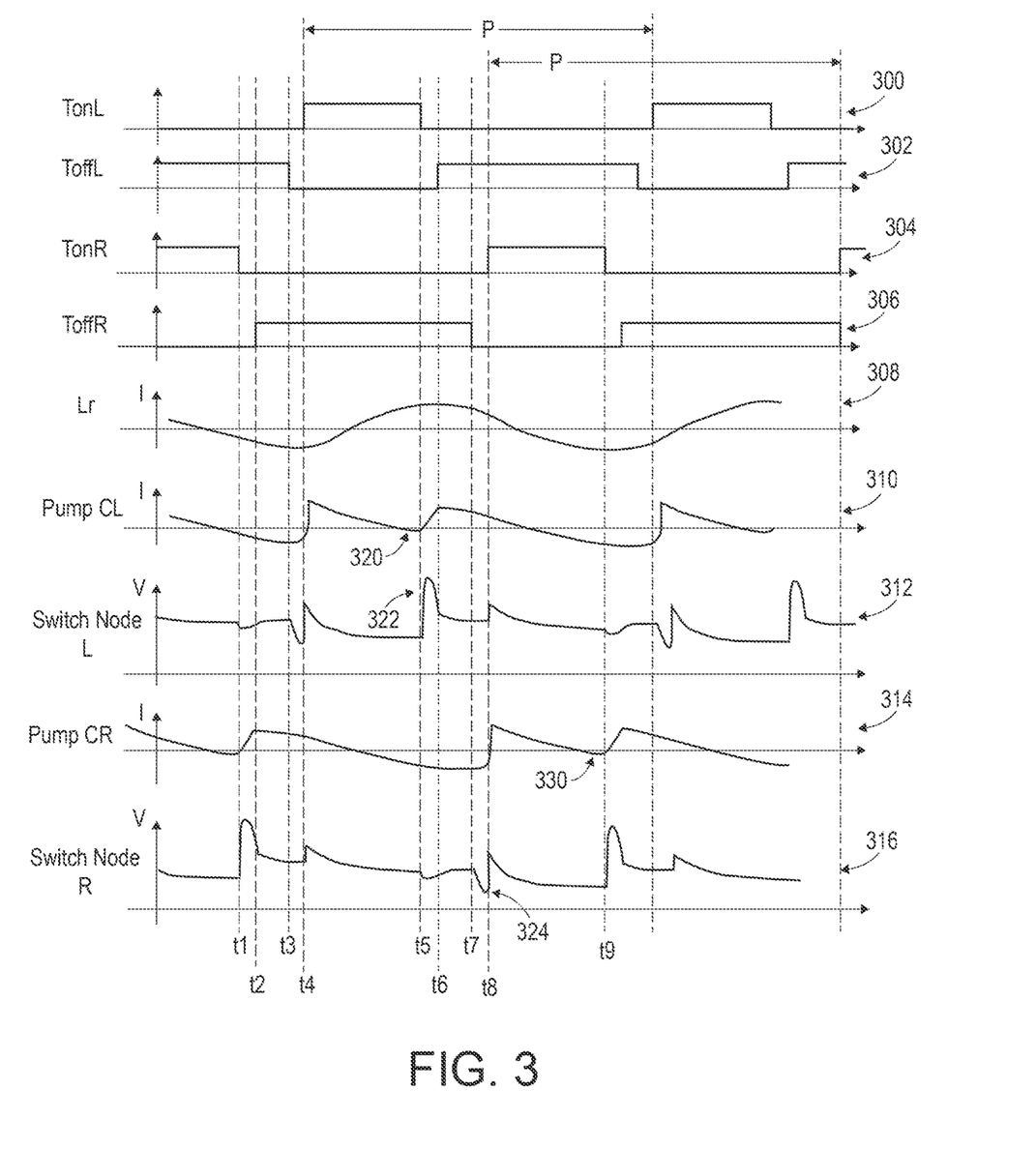
FIG. 3 shows a timing diagram in accordance with at least some embodiments.

FIG. 3 shows an example timing diagram. In particular: plot 300 shows an example left on-time signal (TonL) applied to the control input of the upper FET 108 and the lower-middle FET 112; plot 302 shows an example left off-time signal (ToffL) applied to the control input of the upper-middle FET 110 and the lower FET 114; plot 304 shows an example right on-time signal (TonR) applied to the control input of the top FET 132 and the bottom FET 138; and plot 306 shows an example right off-time signal (ToffR) applied to the control input of the top-middle FET 134 and the bottom FET 138. Each of the signals in plots 300, 302, 304, and 306 are Boolean signals, and are illustratively shown as asserted high. However, the asserted state of the signals may take any suitable form (e.g., asserted low) at the discretion of the circuit designer and based on the type of electrically-controlled switches implemented. Following the naming convention introduced above regarding the left on-time, the off-time of the left switching-tank circuit 102 is referred to as the left off-time. Similarly, the on-time of the right switching-tank circuit 104 is referred to as the right on-time, and the off-time of the right switching-tank circuit 104 is referred to as the right off-time.

As discussed above, the on-times occur at a switching frequency having a switching period. For example, the left on-time occurs at the switching frequency being the inverse of a switching period P shown between any two corresponding features of the example left on-time TonL signal (e.g., rising edges as shown). Similarly, the right on-time occurs at the switching frequency being the inverse of a switching period P between any two corresponding features of the example right on-time TonR signal (e.g., rising edges as shown). FIG. 3 also shows that while the on-times occur at the same switching frequency, the on-times occur at different phase relationship (e.g., 180° degrees).

As alluded to in reference to FIG. 1 by way of the logic NOT gate 122, the left off-time signal ToffL is the inverse or logical NOT of the left on-time signal TonL. In particular, the left off-time signal ToffL is asserted at times when the left on-time signal TonL is de-asserted, and vice versa. In order to avoid shoot through, example systems may implement a dead time between assertions of the TonL and ToffL signals. In the example timing diagram of FIG. 3, the left off-time signal ToffL goes de-asserted at time t3, and after a dead time (e.g., about 40 nano-seconds (ns)) the left on-time signal goes asserted at time t4. At the end of the left on-time TonL, the left on-time signal TonL goes de-asserted at time t5, and after a dead time the left off-time signal ToffL goes asserted at time t6.

Similarly, the right off-time signal ToffR is the inverse or logical NOT of the right on-time signal TonR. In particular, the right off-time signal ToffR is asserted at times when the right on-time signal TonR is de-asserted, and vice versa.

Again to avoid shoot through, example systems may implement a dead time (e.g., about 40 ns) between assertions of the TonR and ToffR signals. In the example timing diagram of FIG. 3, the right on-time signal TonR goes de-asserted at time t1, and after a dead time the right off-time signal ToffR signal goes asserted at time t2. At the end of the right off-time ToffR, the right off-time signal ToffR goes de-asserted at time t7, and after a dead time the right on-time signal TonR goes asserted at time t8.

Moreover, for reasons that will become clearer based on the discussion below, the changes of state as between the left switching-tank circuit 102 and the right switching-tank circuit 104 may also implement a reset time. In the example timing diagram of FIG. 3, the right on-time signal TonR goes de-asserted at time t1 and the right off-time signal ToffR goes asserted at time t2, and after a reset time (e.g., between t2 and t3) the left off-time signal ToffL goes de-asserted at time t3 and the left on-time signal TonL goes asserted at time t4. Similarly, later in the cycle the left on-time signal TonL goes de-asserted at time t5 and the left off-time signal ToffL goes asserted at time t6, and after a reset time the right off-time signal ToffR goes de-asserted at time t7 and the right on-time signal TonR goes asserted at time t8.

Still referring to FIG. 3, the example timing diagram also shows several analog signals of interest during the example on-times and off-times. In particular: plot 308 shows an example waveform of the resonant inductor current (Lr); plot 310 shows an example waveform of current flow associated with the left pump capacitor 124 (Pump CL); plot 312 shows an example waveform of the voltage at the left switch node 118 (Switch Node L); plot 314 shows an example waveform current flow associated with the right pump capacitor 148 (Pump CR); and plot 316 shows an example waveform of the voltage at the right switch node 142 (Switch Node R).

Referring simultaneously to FIGS. 2A, 2B, and 3. FIGS. 2A and 2B show the circuit with example current flows at the beginning of the left on-time and near the end of the left on-time, respectively. An example left on-time is shown in FIG. 3 starting at time t4. In particular, just after time t4 the current flow through the resonant inductor Lr shows to be negative. For purposes of this discussion, a negative current flow in plot 308 signifies current flowing from the left switching-tank circuit 102 to the right switching-tank circuit 104. Oppositely, a positive current flow in plot 308 signifies current flowing from the right switching-tank circuit 104 to the left switching-tank circuit 102. However, the designation of positive and negative current flow through the resonant inductor 152 is arbitrary. Initially in the left on-time, the resonant inductor 152 draws current away from the left switching-tank circuit 102. Moreover, the output inductor 126, though being charged during the left on-time, is still providing current to the voltage output $V_{OUT}$. Thus, all the current flow in the initial portions of the left on-time is provided by the left pump capacitor 124, the current flow shown in plot 310 by the initial spike in current flow just after time t4. A corresponding amount of current flows through the upper FET 108 (e.g., as shown by arrow 206).

However, as the example left on-time continues, the resonant inductor 152 interacts with the various capacitances of the CLC resonant circuit, and thus the current through the resonant inductor 152 reverses direction and flows into the left switching-tank circuit 102, as shown in plot 308. As the current provided to the left switch node 118 from the resonant inductor 152 increases, the current associated with the left pump capacitor 124 and upper FET 108 decreases correspondingly, as shown in plot 310. That is, the current flow to the left switch node 118 from the resonant inductor 152 reduces the current flow through the upper FET 108. In accordance with example systems and methods, the current flow in the later portions of the left on-time charges the pump capacitor 124 sufficiently to reduce current flow through the upper FET 108, and in the example case shown the current flow through the pump capacitor 124 and upper FET 108 reverses direction, as shown by reverse current at point 320. Once the reduction in current flow occurs the example left on-time ends at time t5. Because of the reduced current flow, the upper FET 108 is made non-conductive during periods of reduced or no current flow.

Figure 4:
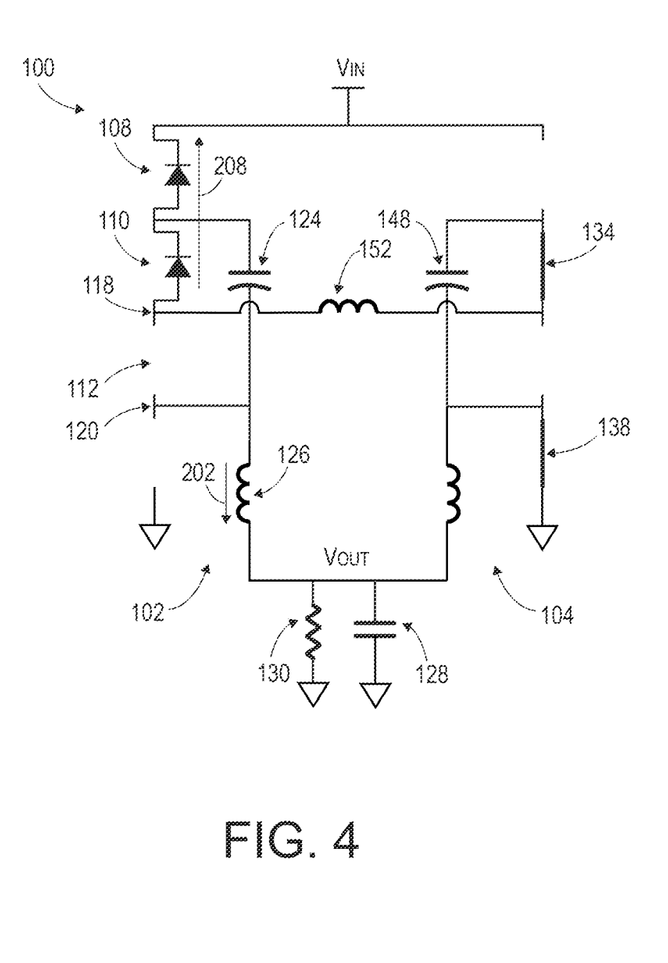
FIG. 4 shows an electrical schematic of the power converter during a dead time between the on-time and the off-time of the example left switching-tank circuit, in accordance with at least some embodiments.

FIG. 4 shows an electrical schematic of the power converter 100 during a left dead time. In particular, when left on-time ends the upper FET 108 and the lower-middle FET 112 become non-conductive. Because of the phase difference between the left and right switching-tank circuits, there is no immediate change to the conductive states of the right switching-tank circuit 104, and thus the top-middle FET 134 and the bottom FET 138 remain conductive. At the instant in time at which the left on-time ends, the resonant current in the resonant inductor 152 still flows toward the left switching-tank circuit 102. With the FETs of the left switching-tank circuit 102 non-conductive, the resonant current of the resonant inductor 152 is forced through the body diodes of the upper-middle FET 110 and the upper FET 108, as shown by arrow 208. The current flow through the body diodes initially drives the voltage at the left switch node 118 to about 1.4V above the voltage input $V_{IN}$ (e.g., two forward voltage drops higher than $V_{IN}$) Eventually, however, the current flow out of the upper lead of the left pump capacitor 124 to supply the output inductor 126 diverts a certain amount of the resonant current into the pump capacitor 124.

Returning to FIG. 3, particularly the portions of the waveforms between t5 and t6. At time t5, the left on-time signal TonL is de-asserted. The resonant current in the resonant inductor 152 still flows toward the left switching-tank circuit 102, as shown by plot 308. The resonant current is forced through the body diodes of the upper-middle FET 110 and the upper FET 108, and thus causes the voltage spike at the left switch node 118, as shown by plot 312 as spike 322. The voltage at the left switch node 118 falls as current flow is diverted into the upper lead of the left pump capacitor 124. The specification now turns to operation of the circuit between example times t6 and t7—the reset time.

Figure 5:
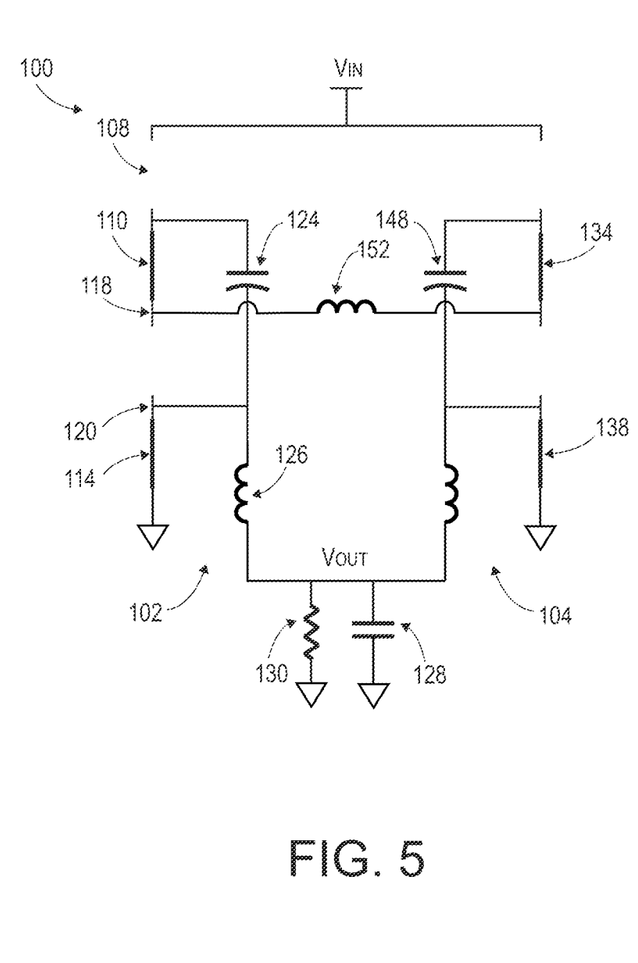
FIG. 5 shows an electrical schematic of the power converter during a reset time between the phases, in accordance with at least some embodiments.

FIG. 5 shows an electrical schematic of the power converter 100 during the reset time between phases. In particular, after the dead time between de-assertion of the left on-time signal TonL and the assertion of the left off-time signal ToffL, the example circuit implements a reset time which resets the voltages of pump capacitors 124 and 148. In particular, in the arrangement of FIG. 5 the lower lead of the left pump capacitor 124 is grounded (by way of the lower FET 114), and the upper lead is coupled to the left lead of the resonant inductor 152 (by way of the upper-middle FET 110). On the right side, the bottom lead of the right pump capacitor 148 is grounded (by way of the bottom FET 138), and the top lead is coupled to the right lead of the resonant inductor 152 (by way of the top-middle FET 134). The arrangement of FIG. 5 enables the respective voltages across the left pump capacitor 124 and the right pump capacitor 148 to substantially equalize in preparation for the upcoming right on-time.

Returning to FIG. 3, particularly the portions of the waveforms between t6 and t7. At time t6, the left off-time signal ToffL is asserted. The current in the resonant inductor 152 still flows toward the left switching-tank circuit 102 but is decreasing, as shown by plot 308. Similarly, the current through the left pump capacitor 124 is decreasing. The voltage at the left switch node 118 thus stabilizes after the prior voltage spike, as shown by plot 312. In particular, the voltage at the left switch node 118 is approaching a value being about half the voltage input $V_{IN}$ (e.g., $V_{IN}/2$). In a similar fashion, the voltage at the right switch node 142 (after a voltage dip between times t5 and t6) stabilizes, as shown by plot 316. In particular, the voltage at the right switch node 142 is also approaching a value being about half the voltage input $V_{IN}$ (e.g., $V_{IN}/2$). The specification now turns to operation of the circuit between example times t7 and t8, being the dead time prior to the upcoming right on-time.

Figure 6:
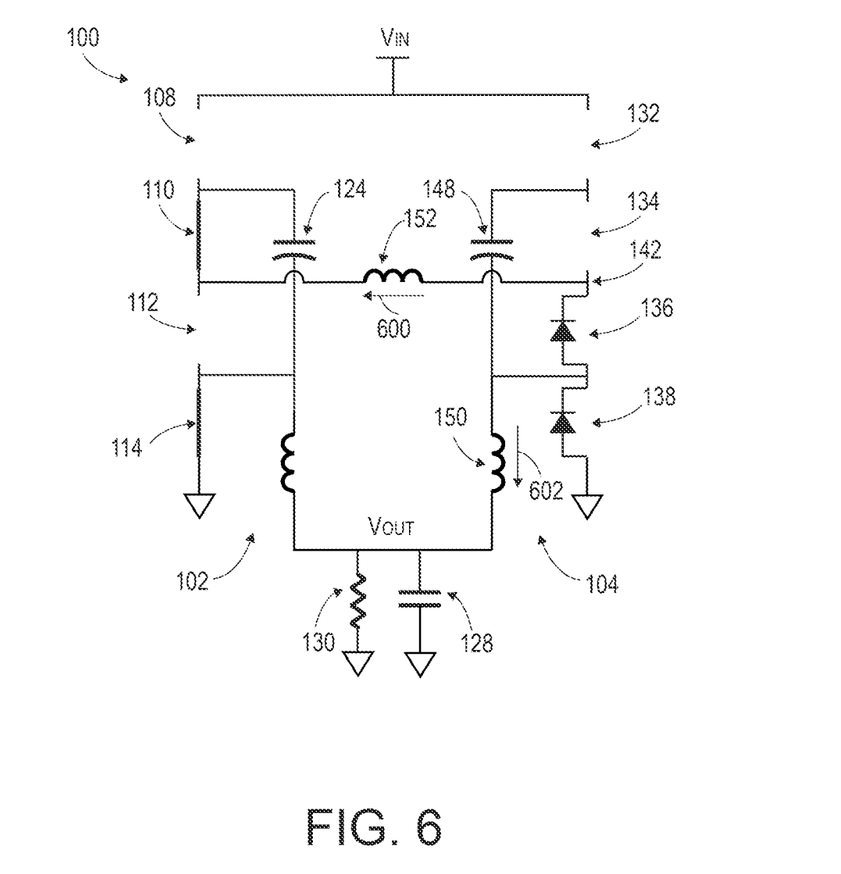
FIG. 6 shows an electrical schematic of the power converter during a dead time between the off-time and the on-time of the right switching-tank circuit, in accordance with at least some embodiments.

FIG. 6 shows an electrical schematic of the power converter 100 during a dead time. In particular, in the dead time between the right off-time and the right on-time, all the FETs in the right switching-tank circuit 104 are non-conductive. Because of the inductance of the resonant inductor 152, during the dead time the resonant current flow is still flowing out of the right switching-tank circuit 104 to the left switching-tank circuit 102, as shown by arrow 600. Because of the non-conductive state of the example FETs in the right switching-tank circuit 104, the resonant current flows through the body diode of the bottom FET 138 and the bottom-middle FET 136. The voltage at the right switch node 142 may drop to about two diode forward voltage drops below the reference voltage (e.g., about −1.4V). Moreover, the output inductor 150 creates a current flow toward the voltage output $V_{OUT}$, as shown by arrow 602.

Returning to FIG. 3, particularly the portions of the waveforms between t7 and t8. At time t7, the right off-time signal ToffR is de-asserted. The resonant current in the resonant inductor 152 still flows toward the left switching-tank circuit 102, as shown by plot 308. The resonant current is forced through the body diodes of the bottom FET 138 and the bottom-middle FET 136, and thus causes the negative voltage spike at the right switch node 142, as shown by plot 316 as spike 324. After the end of the dead time between times t7 and t8, the right on-time begins by assertion of the right on-time signal TonR.

The description of operation during the right on-time is duplicative of the description of the left on-time (e.g., FIGS. 2A and 2B), except mirrored to the right side. In particular, notice how the waveforms between times t8 and t9 associated with the right pump capacitor 148 (plot 314) and right switch node 142 (plot 316) are duplicative of the waveforms between times t4 and t5 associated with the left pump capacitor 124 (plot 310) and the left switch node (plot 312). That is, during the right on-time the right output inductor 150 is charged. Moreover, while resonant current initially flows away from the right switching-tank circuit 104, the resonant current changes direction and flows to the right switching-tank circuit 104, as shown by plot 310. The resonant current flow in the later portions of the right on-time charges the pump capacitor 148 sufficiently to reduce current flow through the top FET 132. In some example cases, the current flow from the voltage input $V_{IN}$ through the top FET 132 to the pump capacitor 148 is reduced to zero, and in other cases the current flow through the top FET 132 reverses direction, as shown by arrow 330. Regardless of the precise magnitude of the reduction of current flow through the top FET 132 (including reversal), once the reduction in current flow occurs the right on-time ends by making the top FET 132 and the bottom-middle FET 136 non-conductive. However, because of the reduced current flow, the top FET 132 being made non-conductive is a soft switching event that reduces power loss, as compared to interrupting signification current flow through the top FET 132.

Thus, at time t9 the right on-time signal TonR goes de-asserted, and the example circuit enters a dead time. The description of operation during the dead time between the de-assertion of the right on-time signal TonR and assertion of the right off-time signal ToffR is duplicative of the description of the dead time associated with the left on-time to left off-time transition (e.g., between times t5 and t6). In particular, notice how the waveforms after time t9 associated with the right pump capacitor 148 (plot 314) and right switch node 142 (plot 316) are duplicative of the waveforms after time t5 associated with the left pump capacitor 124 (plot 310) and the left switch node (plot 312).

Still referring to FIG. 3, and in particular the plot 308 showing the current through the resonant inductor 152. During the example left on-time between times t4 and t5, the resonant current completes about a half-period of a resonant period of the CLC resonant circuit. More particularly, for the example left on-time the resonant current achieves a positive peak current at about time t5. As discussed above, the positive peak current is used to reduce the voltage and current across the upper FET 108 at the end of the left on-time. Similarly, during the example right on-time between times t8 and t9, the resonant current completes about a half-period of the resonant period of the CLC resonant circuit. More particularly, for the example right on-time the resonant current achieves a negative peak current at about time t9. As discussed above, the negative peak current is used to reduce the voltage and current across the top FET 132 at the end of the right on-time. It follows that the inductance of the resonant inductor, taking into consideration of capacitances of the pump capacitors 124 and 148, is selected to have a resonant period about equal to the on-time for each of the left on-time and the right on-time. In steady state operation, the left on-time is equal to or about equal to the right on-time, and further in steady state operation the on-times are constant or about constant.

It turns out, however, that the CLC resonant circuit has two resonant frequencies, and thus two resonant periods. In particular, the CLC resonant circuit has a higher frequency resonance given by the following equation:

$$F_H = \frac{1}{2\pi}\sqrt{LrCr} \qquad 1)$$

where $F_H$ is the higher frequency resonance, Lr is the inductance of the resonant inductor 152, and Cr is the capacitance of a pump capacitor (assuming the capacitances of the pump capacitors are the same). The CLC resonant circuit also has a lower frequency resonance given by the following equation:

$$F_L = \frac{1}{2\pi}\sqrt{Lr \cdot Cr/4} \qquad 2)$$

where $F_L$ is the lower frequency resonance and the remaining parameters are as described above.

When the switching frequency for the overall power converter 100 is at or above the higher frequency resonance $F_H$, the transfer function (e.g., ratio of $V_{OUT}/V_{IN}$) of the power converter 100 approaches unity, and thus not operable as a buck converter. However, when operated at or below the lower frequency resonance $F_L$, the transfer function (e.g., ratio of $V_{OUT}/V_{IN}$) of the power converter approaches about 0.5. For use as buck converter then, the switching frequency of power converter 100 is selected to be at or below the lower frequency resonance $F_L$. Moreover, when the switching frequency is below the lower frequency resonance $F_L$, the various FETs of the left and right switching-tank circuits may be selected to have a drain-to-source breakdown voltage lower than the voltage input $V_{IN}$, as in operation the highest drain-to-source voltage seen by any single FET is about half the voltage input (e.g., $V_{IN}/2$). For example, even if the high end of the voltage input $V_{IN}$ range is 60V, FETs with a 30V drain-to-source breakdown voltage may be selected and used, significantly lowering the cost of the overall power converter 100.

During the design phase, the on-time is selected based on the designed voltage output $V_{OUT}$. In particular, the duty cycle of the power converter 100 may be given by the following equation:

$$D = V_{OUT}/(V_{IN}/2) \quad \quad 3)$$

where D is the duty cycle. Given an expected voltage input $V_{IN}$, and a selected voltage output $V_{OUT}$, the duty cycle is thus provided by Equation 3). With a duty cycle D determined, on-time is the switching period P (FIG. 3) multiplied by the duty cycle D.

Period is the inverse of frequency, and thus the higher frequency resonance $F_H$ has a shorter period, and the lower frequency resonance $F_L$ has a longer period. The inductance of the resonant inductor 152 is selected such that the resonant period of the CLC resonant circuit is about twice the on-time, and again the switching frequency for the overall power converter 100 is selected to be below the lower frequency resonance $F_L$. Stated differently, the switching frequency of the power converter 100 should be at or below the lower frequency resonance $F_L$, and each on-time should have a duration of about half the resonant period of the lower frequency resonance $F_L$.

Regarding cold start operation (e.g., pump capacitors discharged and output inductors carrying no current). At initial power up, the example system may utilize a pre-charge circuit (not specifically shown) that pre-charges both pump capacitors to a value of about half the voltage input (e.g., $V_{IN}/2$) to make the circuit more stable during soft start (discussed more below). Moreover, while in steady-state operation the left on-time and right on-time may be fixed and equal to about half the resonant period, during soft start the on-times may initially be shorter, and the on-times may ramp over time toward a final duration being about half the resonant period of the CLC resonant circuit. During the soft start, the resonant inductor 152 may carry very little, if any, current and thus reduced-voltage switching of the upper FET 108 and top FET 132 may be unavailable during soft start operation.

As implied by FIG. 3, in steady-state operation and with nominal voltage input $V_{IN}$ the on-times are less than half the switching period, taking into account the dead times as well as the reset times. Stated differently, the duty cycle of the left on-time signal TonL, and the duty cycle of the right on-time signal TonR, are less than 50%. However, in the event of a low-voltage excursion of the voltage input $V_{IN}$, the controller 106 may increase the duty cycle to above 50%, and thus increase the on-times such that the left on-time overlaps the right on-time (and vice versa). The example power converter 100 would still be operational in such a circumstance; however, the resonant current of the resonant inductor 152 likely would not align with either on-time, and thus the reduced-voltage switching of the upper FET 108 and top FET 132 may be temporarily unavailable during such low-voltage excursions.

Figure 7:
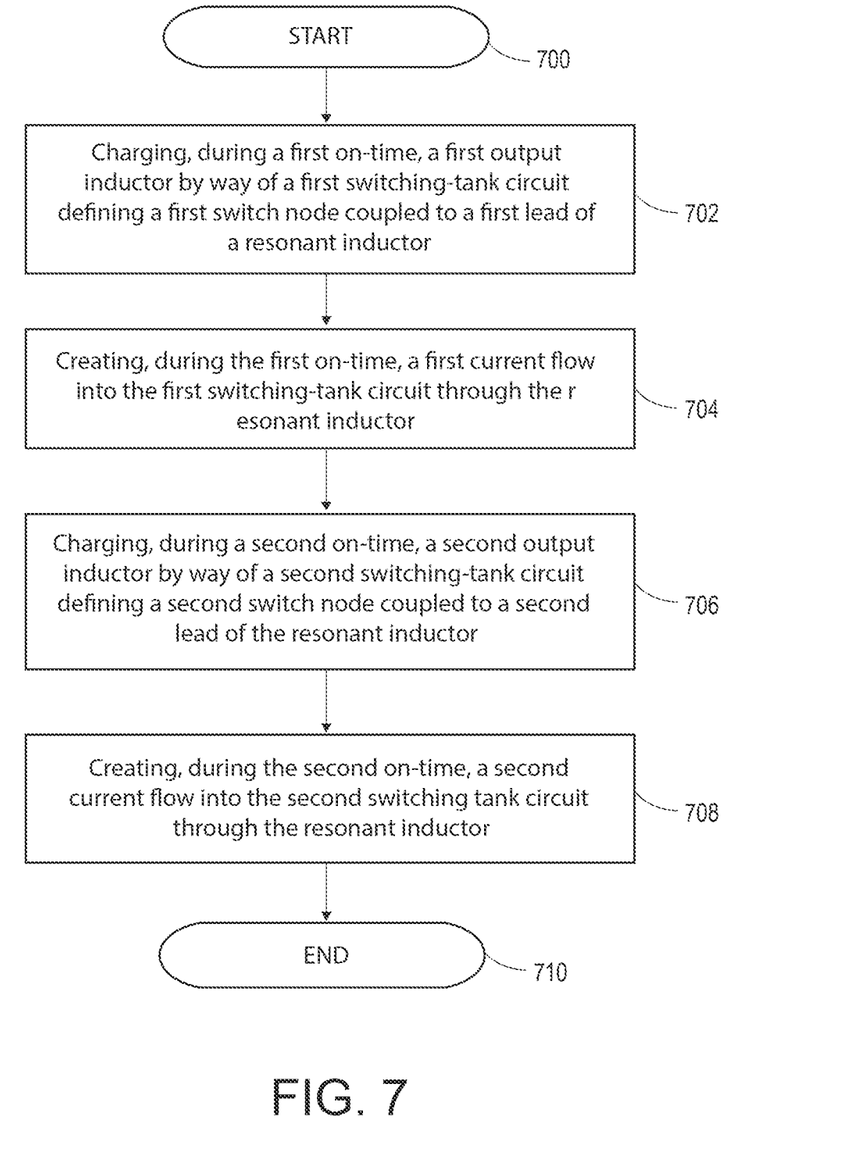
FIG. 7 shows a method in accordance with at least some embodiments.

FIG. 7 shows a method in accordance with at least some embodiments. In particular, the method starts (block 700). The example method comprises: charging, during a first on-time, a first output inductor by way of a first switching-tank circuit defining a first switch node coupled to a first lead of a resonant inductor (block 702); and creating, during the first on-time, a first current flow into the first switching-tank circuit through the resonant inductor (block 704). The first current flow into the first switching-tank circuit reduces current flow through an electrically-controlled switch, which enables soft switching. The example method may further comprise: charging, during a second on-time, a second output inductor by way of a second switching-tank circuit defining a second switch node coupled to a second lead of the resonant inductor (block 706); and creating, during the second on-time, a second current flow into the second switching tank circuit through the resonant inductor (block 708). The second current flow into the second switching-tank circuit reduces current flow through another electrically-controlled switch, which enables soft switching. Thereafter, the example method ends (block 710), likely to be restarted in the next switching period.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, the method comprising
   charging, during a first on-time, a first output inductor by way of a first switching-tank circuit defining a first switch node coupled to a first lead of a resonant inductor;
   creating, during the first on-time, a first current flow into the first switching-tank circuit through the resonant inductor; and then
   equalizing, at least partly, a voltage of a first pump capacitor of the first switching-tank circuit and a voltage of a second pump capacitor of a second switching-tank circuit, wherein the first pump capacitor, the resonant inductor, and the second pump capacitor have a lower resonant frequency and a higher resonant frequency;
   charging, during a second on-time, a second output inductor by way of the second switching-tank circuit defining a second switch node coupled to a second lead of the resonant inductor;
   creating, during the second on-time, a second current flow into the second switching-tank circuit through the resonant inductor;
   repeating the charging of the first output inductor at a switching frequency, wherein the switching frequency is lower than the lower resonant frequency.

2. The method of claim 1 wherein the first on-time is about half a resonant period of a periodic current through the resonant inductor.

3. The method of claim 2 wherein the second on-time is about half the resonant period of the periodic current.

4. The method of claim 1 further comprising, during the first on-time:

reducing current flow through an upper electrically-controlled switch of the first switching-tank circuit by way of the first current flow; and then ending the first on-time by making the upper electrically-controlled switch non-conductive.

5. The method of claim 4 wherein reducing current flow through the upper electrically-controlled switch further comprises reversing current flow through the upper electrically-controlled switch.

6. The method of claim 4 further comprising, during the second on-time:

reducing current flow through a top electrically-controlled switch of the second switching-tank circuit by way of the second current flow; and then ending the second on-time by making the top electrically-controlled switch non-conductive.

7. The method of claim 6 wherein reducing current flow through the top electrically-controlled switch further comprises reversing current flow through the top electrically-controlled switch of the second switching-tank circuit.

8. The method of claim 1 further comprising, during the second on-time:

reducing current flow through a top electrically-controlled switch of the second switching-tank circuit by way of the second current flow; and then ending the second on-time by making the top electrically-controlled switch non-conductive.

9. The method of claim 8 wherein reducing current flow through the top electrically-controlled switch further comprises reversing current flow through the top electrically-controlled switch of the second switching-tank circuit.

10. A power converter comprising:

a resonant inductor having a first lead and a second lead;

a first switching-tank circuit defining a first charge node coupled to a first lead of a first pump capacitor, a first phase node coupled to a second lead of the first pump capacitor, and a first switch node coupled to the first lead of the resonant inductor;

a first output inductor having a first lead coupled to the first phase node, and a second lead coupled to a voltage output;

a second switching-tank circuit defining a second charge node coupled to a first lead of a second pump capacitor, a second phase node coupled to a second lead of the second pump capacitor, and a second switch node coupled to the second lead of the resonant inductor, wherein the first pump capacitor, the resonant inductor, and the second pump capacitor have a lower resonant frequency and a higher resonant frequency;

a second output inductor having a first lead coupled to the second phase node, and a second lead coupled to the voltage output;

a controller coupled to the first switching-tank circuit and the second switching-tank circuit, the controller configured to:

operate the first switching-tank circuit at a switching frequency, a first on-time, and a first phase, wherein the switching frequency is lower than the lower resonant frequency;

operate the second switching-tank circuit at the switching frequency, a second on-time, and a second phase different than the first phase; and wherein the first on-time is about half a resonant period of a resonant circuit comprising the first pump capacitor, the resonant inductor, and the second pump capacitor.

11. The power converter of claim 10 wherein the controller is further configured such that the second on-time is about half the resonant period of the resonant circuit.

12. The power converter of claim 10 wherein the first on-time is equal to the second on-time.

13. The power converter of claim 10 wherein the first pump capacitor, the resonant inductor, and the second pump capacitor have a longer resonant period and a shorter resonant period, and wherein the first on-time is about half the longer resonant period.

14. The power converter of claim 10 wherein the first switching-tank circuit further comprises:

an upper electrically-controlled switch having a first connection coupled to a voltage input, a second connection defining the first charge node, and a control input coupled to the controller;

an upper-middle electrically-controlled switch having a first connection coupled to the first charge node, a second connection defining the first switch node, a control input coupled to the controller;

a lower-middle electrically-controlled switch having a first connection coupled to the first switch node, a second connection defining the first phase node, and a control input coupled to the controller; and a lower electrically-controlled switch having a first connection coupled to the first phase node, a second connection coupled to a reference voltage, and a control input coupled to the controller.

15. The power converter of claim 10 wherein the second switching-tank circuit further comprises:

a top FET having a first connection coupled to a voltage input, a second connection defining the second charge node, and a control input coupled to the controller;

a top-middle FET having a first connection coupled to the second charge node, a second connection defining the second switch node, a control input coupled to the controller;

a bottom-middle FET having a first connection coupled to the second switch node, a second connection defining the second phase node, and a control input coupled to the controller; and a bottom FET having a first connection coupled to the second phase node, a second connection coupled to a reference voltage, and a control input coupled to the controller.

16. The power converter of claim 15 wherein the first switching-tank circuit further comprises:

an upper FET having a first connection coupled to a voltage input, a second connection defining the first charge node, and a control input coupled to the controller;

an upper-middle FET having a first connection coupled to the first charge node, a second connection defining the first switch node, a control input coupled to the controller;

a lower-middle FET having a first connection coupled to the first switch node, a second connection defining the first phase node, and a control input coupled to the controller; and a lower FET having a first connection coupled to the first phase node, a second connection coupled to a reference voltage, and a control input coupled to the controller.

* * * * *